(12) United States Patent
Zidar

(10) Patent No.: US 7,862,902 B2
(45) Date of Patent: Jan. 4, 2011

(54) MULTI-LAYERED BEARING

(75) Inventor: Jakob Zidar, Altmünster (AT)

(73) Assignees: Miba Gleitlager GmbH (AT); KS Gleitlager GmbH (DE)

( * ) Notice: Subject to any disclaimer, the term of this patent is extended or adjusted under 35 U.S.C. 154(b) by 705 days.

(21) Appl. No.: 11/811,267

(22) Filed: Jun. 8, 2007

(65) Prior Publication Data
US 2008/0102307 A1 May 1, 2008

(30) Foreign Application Priority Data
Jun. 9, 2006 (AT) ................................. A 990/2006

(51) Int. Cl.
*F16C 33/12* (2006.01)
(52) U.S. Cl. ........................ 428/642; 428/673; 428/674; 428/935; 384/912; 384/913
(58) Field of Classification Search ........................ None
See application file for complete search history.

(56) References Cited

U.S. PATENT DOCUMENTS

| 5,209,578 | A | 5/1993 | Eastham et al. | |
|---|---|---|---|---|
| 5,573,856 | A | 11/1996 | Shinonaga et al. | |
| 6,309,759 | B1 * | 10/2001 | Tomikawa et al. | 428/642 |
| 6,575,635 | B1 * | 6/2003 | Tsuji et al. | 384/276 |
| 6,863,441 | B2 | 3/2005 | Kawachi et al. | |
| 6,866,421 | B2 | 3/2005 | Tanaka et al. | |
| 7,368,046 | B2 * | 5/2008 | Adam et al. | 205/181 |
| 2004/0202887 | A1 * | 10/2004 | Kawachi et al. | 428/642 |
| 2004/0241489 | A1 * | 12/2004 | Kawachi et al. | 428/642 |
| 2006/0029795 | A1 | 2/2006 | Sawyer et al. | |
| 2006/0182375 | A1 | 8/2006 | Kraemer et al. | |
| 2006/0216539 | A1 * | 9/2006 | Takayanagi et al. | 428/642 |
| 2007/0269147 | A1 * | 11/2007 | Rumpf | 384/7 |

FOREIGN PATENT DOCUMENTS

| DE | 100 32 624 A1 | 4/2001 |
|---|---|---|
| DE | 100 54 461 A1 | 5/2001 |
| DE | 10 2004 015 827 A1 | 11/2004 |
| DE | 10 2004 025 560 A1 | 1/2005 |
| DE | 10 2004 055 228 A1 | 5/2006 |
| GB | 2380772 A | 4/2003 |
| GB | 2402135 A | 12/2004 |
| JP | 4-028836 A | 1/1992 |

(Continued)

OTHER PUBLICATIONS

Salazar-Perez, et al., Structural Evolution of Bi2O3 Prepared by Thermal Oxidation of Bismuth Nano-Particles, Sep. 2005, pp. 4-8, V18, No. 3.

(Continued)

*Primary Examiner*—John J Zimmerman
(74) *Attorney, Agent, or Firm*—Lerner, David, Littenberg, Krumholz & Mentlik, LLP

(57) ABSTRACT

The invention describes a multi-layered bearing with a supporting metal layer, optionally a bearing metal layer disposed on top of it, an anti-friction layer on top of the latter as well as a wearing layer on top of it. The wearing layer is made from bismuth or a bismuth alloy and the anti-friction layer is made from a copper-bismuth or silver-bismuth alloy or silver.

18 Claims, 1 Drawing Sheet

FOREIGN PATENT DOCUMENTS

| | | |
|---|---|---|
| JP | 11-050 296 A | 2/1999 |
| WO | 2005/015037 A1 | 2/2005 |

OTHER PUBLICATIONS

Fang, et al., Self-Assembled Bismuth Nanocrystallites, Sep. 2001, pp. 1872-1873, Chem. Commun.

Search Report from GB Application No. 0711084, dated Sep. 27, 2007.

Office Action from German Application No. A2006/1300.am, dated May 14, 2007.

* cited by examiner

MULTI-LAYERED BEARING

CROSS REFERENCE TO RELATED APPLICATIONS

Applicants claim priority under 35 U.S.C. §119 of AUSTRIAN Patent Application No. A 990/2006 filed on Jun. 9, 2006.

BACKGROUND OF THE INVENTION

1. Field of the Invention

The invention relates to a multi-layered bearing with a supporting metal layer, optionally a bearing metal layer, an anti-friction layer and a wearing layer.

2. Prior Art

Multi-layered bearing are already known from the prior art. For example, patent specification DE 100 54 461 C describes a multi-layered friction-type bearing with a supporting metal layer, a bearing alloy coating, an intermediate plate coating and a finishing layer with a base of tin, and the finishing layer with a tin base contains a reinforcing metal and/or inorganic particles, and the content of the reinforcing metal and/or inorganic particles is varied in steps or continuously in the direction of the thickness of the finishing layer so that the content is relatively high in a middle region of the finishing layer by reference to the thickness, and in the surface region of the finishing layer the content is zero or lower than the content in the middle region of the finishing layer. The intention is to produce a multi-layered friction-type bearing which does not lead to problems in terms of its resistance to wear causing seizing, and the quantity of added lead is reduced or no lead is used, and it also has an outstanding resistance to abrasion.

Patent specification DE 100 2004 015 827 A discloses a friction-type component comprising a rear face metal coat, a friction-type alloy coating on the rear face metal coat and a finishing layer on the friction-type alloy coating, and the finishing layer is made of bismuth or bismuth alloy, and in the crystal lattice of the finishing layer a surface has a degree of orientation as specified with the Miller-Index (202) which is not lower than 30% and the index of X-ray diffraction intensity $R_{(202)}$ of the (202) surface assumes a maximum value compared with other surfaces. This friction-type component is described as having excellent anti-blocking properties.

Patent specification DE 10 2004 055 228 A discloses a bearing shell of a connecting rod, which is disposed in the large connecting rod eye, and the bearing shell is made from several thermally sprayed layers, and the uppermost material layer of the bearing shell is essentially made from an aluminum-bismuth alloy. Disposed underneath the latter is a layer of bearing alloy, in particular of bronze or brass. The bismuth content is between 10 and 40% by weight. In addition, it may also contain tin or antimony in a quantity of from 3 to 6% by weight, copper in a quantity of 0.1 to 5% by weight, tin and lead in a quantity of less than 0.5% by weight. The intention is to produce an inexpensive bearing shell which satisfies the highest pressure, temperature as well as strength and durability requirements.

SUMMARY OF THE INVENTION

The objective of this invention is to propose a lead-free multi-layered bearing.

This objective is achieved by the invention on the basis of the multi-layered bearing mentioned above, in which the wearing layer is formed by bismuth or a bismuth alloy and the anti-friction layer is formed by a copper-bismuth or silver-bismuth alloy or by silver.

Not only does this multi-layered bearing not contain lead—and in this respect it should be pointed out that free of lead within the meaning of the invention should be construed as meaning that no additional lead is added but there may be some lead present under certain circumstances occurring as unavoidable impurities when producing the metals or initial alloys—the invention also offers a multi-layered bearing which has a high durable strength, in particular on exposure to higher stress due to pressure and temperature, as well as a reduced tendency to seizure. This is all the more remarkable because bismuth, which is applied to the multi-layered bearing as the outermost layer, is brittle. As a result of the copper-bismuth or silver-bismuth alloy, a corresponding hardness can also be imparted to the anti-friction layer, thereby resulting in less wear, especially during periods of longer use.

In one embodiment, bismuth or a bismuth alloy is used for the wearing layer, which exhibits a clear orientation of the crystallites. The X-ray diffraction intensity of the lattice plane (012) or (012) is the highest compared with the X-ray diffraction intensities of the other lattice planes. This is all the more surprising given that, based on the prior art (e.g. DE 100 32 624 A), it has long been thought that bismuth coatings are only suitable if the preferred orientation is not limited to a few specific planes, as is the case with this embodiment of the invention.

The X-ray diffraction intensity of the lattice plane with the second highest X-ray diffraction intensity, in particular that with the Miller Index (024) or (024), may assume a maximal value of 10% of the X-ray diffraction intensity of the lattice plane (012) or (012). This therefore results in a higher degree of orientation of the crystallites in the wearing layer.

In order to increase the degree of orientation of the crystallites, the crystallites in the wearing layer assume an orientation so that the sum of the X-ray diffraction intensities of all the other lattice planes that are different from the lattice plane (012) or (012) assume a maximal value of 25% of the X-ray diffraction intensity of the lattice plane (012) or (012).

The wearing layer preferably has a layer thickness which is selected from a range with a lower limit of 1 μm and an upper limit of 10 μm. More preferably, layer thicknesses are used which are selected from a range of 3 μm to 6 μm Due to this slim layer thickness, the tribological suitability of the intrinsically brittle bismuth is further improved, so that brittleness now plays only a minor role.

The copper-bismuth or silver-bismuth alloy of the anti-friction layer may be formed with a matrix of copper or silver, in each case with the unavoidable impurities which result when producing these metals, and the bismuth as a proportion may be selected from a range with a lower limit of 2% by weight in the case of silver or 0.5% by weight in the case of copper and an upper limit of 49% by weight in each case. Surprisingly in this respect, it has been found that in the binary alloys of silver and bismuth or copper and bismuth, bismuth is not only able to assume the function of the soft phase which is responsible for the embedding capacity of the anti-friction layer, but bismuth also contributes to increasing the wear resistance. As a result, the properties obtained are similar to those obtained by lead-bronzes which have been used for these purposes in the prior art and the anti-friction layer therefore exhibits low wear.

The anti-friction layer may contain hard particles with a grain size selected from a range with a lower limit of 10 nm and an upper limit of 100 nm. As a result of these so-called nano-particles, the sliding capacity is not detrimentally affected and the surface of the anti-friction layer does not have any disruptive hard peaks, etc. Furthermore, these particles are preferably present in the dispersed bismuth phase, which means that precisely in the case of higher proportions of bismuth in the alloy, the risk of breaking at the grain boundaries is reduced.

The hard particles are preferably selected from a group comprising oxides, carbides, nitrides, such as titanium dioxide, zirconium dioxide, aluminum oxide, tungsten carbide, silicon nitride for example, as well as diamond, and mixtures of two of these different substances, because these particles exhibit a high degree of hardness.

In one embodiment, the proportion of hard particles by reference to the silver-bismuth or copper-bismuth alloy may be selected from within a lower limit of 0.05% by volume and an upper limit of 5% by volume, because with this proportion, at least the major part of these particles is distributed in the bismuth phase due to the low melting point of bismuth, thereby increasing the structural strength of the anti-friction layer. The hard particles co-exist with the bismuth phase. In particular, it is of advantage if the proportion of nano-particles is selected from a range with a lower limit of 0.5% by volume and an upper limit of 3% by volume or from a range with a lower limit of 1% by volume and an upper limit of 2.5% by volume. For example, the proportion may be 0.1% by volume or 0.9% by volume or 1.5% by volume or 2% by volume or 3.5% by volume or 4% by volume or 4.5% by volume.

An intermediate layer may be disposed between the anti-friction layer and the bearing metal layer, which may be silver, copper, aluminum, manganese, nickel, iron, chromium, cobalt, molybdenum, palladium, a nickel-tin alloy or a copper-tin alloy, such as $Cu_6Sn_5$, $Ni_2Sn_3$, $Ni_3Sn_4$, for example. This improves the adhesion strength of the layer join.

It is also possible to provide a protective layer of silver or copper between the supporting metal layer and the bearing metal layer, thereby preventing cementation of at least individual constituents of the bearing metal layer on the supporting metal layer.

In this respect, it is of advantage if this protective layer is applied not only in the region of the mutually adjoining surfaces of the supporting metal layer and bearing metal layer, but also to the side or end faces of the supporting metal layer.

It is possible for the supporting metal layer to be completely coated with a silver or copper layer, in other words the rear face of the supporting metal layer, in order to protect it more effectively against corrosion or friction-induced wear due to micro-movements which can occur if the multi-layered bearing proposed by the invention is used for bearing bushes or half-shells for anti-friction bearings and the components are retained in metal mounts.

It is also of advantage if the anti-friction layer is provided in the form of a so-called graded layer, with a graded concentration of the bismuth element, in which case the concentration of bismuth increases in the direction towards the wearing layer. Accordingly, the anti-friction layer becomes softer in the direction towards the wearing layer, thereby improving the embedding capacity for foreign particles caused by abrasion. The anti-friction layer nevertheless retains sufficient strength and the join has sufficient strength in the surface region lying opposite the wearing layer due to the hardness of the anti-friction layer. The concentration curve of the layer may be variable, i.e. stepless or continuous, or stepped, i.e. discontinuous. If the transition is stepless, it may be linear or conform to a curve. The increase in the concentration of bismuth in the anti-friction layer may be such that the upper-most layer contains pure bismuth or a soft alloy, for example, with a proportion of copper or a proportion of silver amounting to 5% by weight. In other words, the copper-bismuth or silver-bismuth alloy within the anti-friction layer in the region of the bearing metal layer or the intermediate layer may be replaced by a bismuth alloy containing a proportion of copper or silver.

At this stage, it should be pointed out that the expression "layers of the anti-friction layer" within the meaning of the invention should not be construed as discrete layers separate from one another, even though such an arrangement is possible.

The bearing metal layer is preferably provided in the form of an alloy with a base of copper or aluminum containing no lead, because these alloy systems have already been sufficiently tried and tested and have been found to have correspondingly high tribological properties and a corresponding resistance to wear.

In preferred embodiments, the supporting metal layer may be used for connecting rods, in the form of an anti-friction bearing half shell or bearing bush. Particularly in the case of the embodiment based on connecting rods, the connecting rod eye may be directly coated with the other layers, thereby obviating the need to use bearing half-shells or bearing bushes. The direct layering may also be built up without providing a bearing metal layer.

In principle, however, it should be pointed out that the multi-layered bearing proposed by the invention is suitable not only for these applications, but also for all applications where an anti-friction bearing is used or needed.

BRIEF DESCRIPTION OF THE DRAWINGS

To provide a clearer understanding of the invention, it will be explained in more detail with reference to the appended drawings. Of the schematically simplified drawings.

DETAILED DESCRIPTION OF PREFERRED EMBODIMENTS

Figure 1:
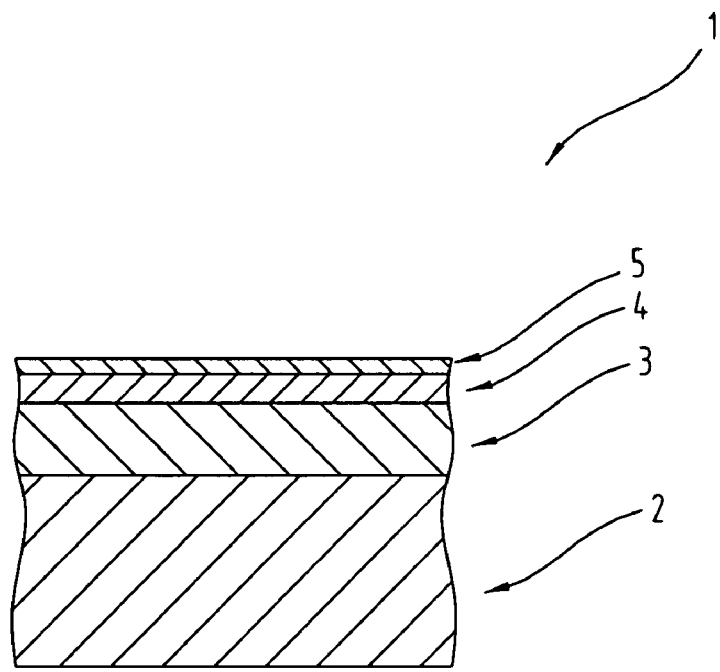
FIG. 1 shows a detail of a first embodiment of a multi-layered bearing proposed by the invention in the form of a bearing with four layers, illustrated in cross-section.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described individual features or combinations of features from the different embodiments illustrated and described may be construed as independent inventive solutions or solutions proposed by the invention in their own right.

FIG. 1 illustrates a multi-layered bearing 1. It may be a plain bearing, in particular a plain bearing half shell, a thrust ring, a bearing bush or a directly coated connecting rod, in particular of a connecting rod eye.

In the case of this embodiment comprising four coatings, the multi-layered bearing 1 comprises a supporting metal layer 2, a bearing metal layer 3 disposed on top of it, an anti-friction layer 4 on top of it and a wearing layer 5 on top of the anti-friction layer 4.

The supporting metal layer 2 may be formed by a steel back for example, or may be made from any material which has the dimensional stability needed for the multi-layered bearing 1. In one particular embodiment, this supporting metal layer 2 is a connecting rod or con rod, if the other layers are deposited directly on this connecting rod. The coatings may also be applied directly without providing a bearing metal layer, in which case the anti-friction layer 4 on which the wearing layer 5 is disposed is applied directly onto the supporting metal layer 2.

The bearing metal layer 3 is made from a lead-free copper or aluminum alloy. Such alloys are already known from the prior art. The following are examples of them:

1. bearing metals with an aluminum base (conforming to DIN ISO 4381 or 4383):
   AlSn6CuNi, AlSn20Cu, AlSi4Cd, AlCd3CuNi, AlSi11Cu, AlSn6Cu, AlSn40, AlSn25CuMn, AlSi11CuMgNi;
2. bearing metals with a copper base (conforming to DIN ISO 4383):
   CuSn10, CuAl10Fe5Ni5, CuZn31Si1, CuPb24Sn2, CuSn8Bi10;
3. bearing metals with a tin base:
   SnSb8Cu4, SnSb12Cu6Pb.

The anti-friction layer 4 is formed by a layer of pure silver containing impurities which occur during melting or the deposition process.

Finally, the wearing layer 5 is made from bismuth or a bismuth alloy, and the alloy partner used with bismuth is primarily at least one element selected from a group comprising copper, silver, tin, antimony and indium in a proportion of at most 10% by weight. The proportion of the at least one alloy element may be selected from a range with a lower limit of 1% by weight and an upper limit of 9% by weight or from a range with a lower limit of 3% by weight and an upper limit of 7% by weight. It is therefore possible to use alloys of bismuth with 2 or 4 or 6 or 8% by weight of at least one of these alloy partners, for example. In a preferred embodiment, the proportion of alloyed elements is in total at most 10% by weight. For example, the alloy may contain 3% by weight Sn and 2% by weight Sb or 4% by weight Sn and 2% by weight In. Other alloy compositions within the specified ranges would also be possible, in which case the condition relating to the orientation of the crystallites described above is preferably satisfied.

In addition to the embodiment of the multi-layered bearing 1 with four layers, a different number of layers is also possible. For example, a diffusion barrier layer and/or a binding layer may be provided between the supporting metal layer 2 and the bearing metal layer 3 and/or between the bearing metal layer 3 and the anti-friction layer 4. For these layers, Al, Mn, Ni, Fe, Cr, Co, Cu, Ag, Mo, Pd and NiSn or CuSn alloys may be considered.

Figure 2:
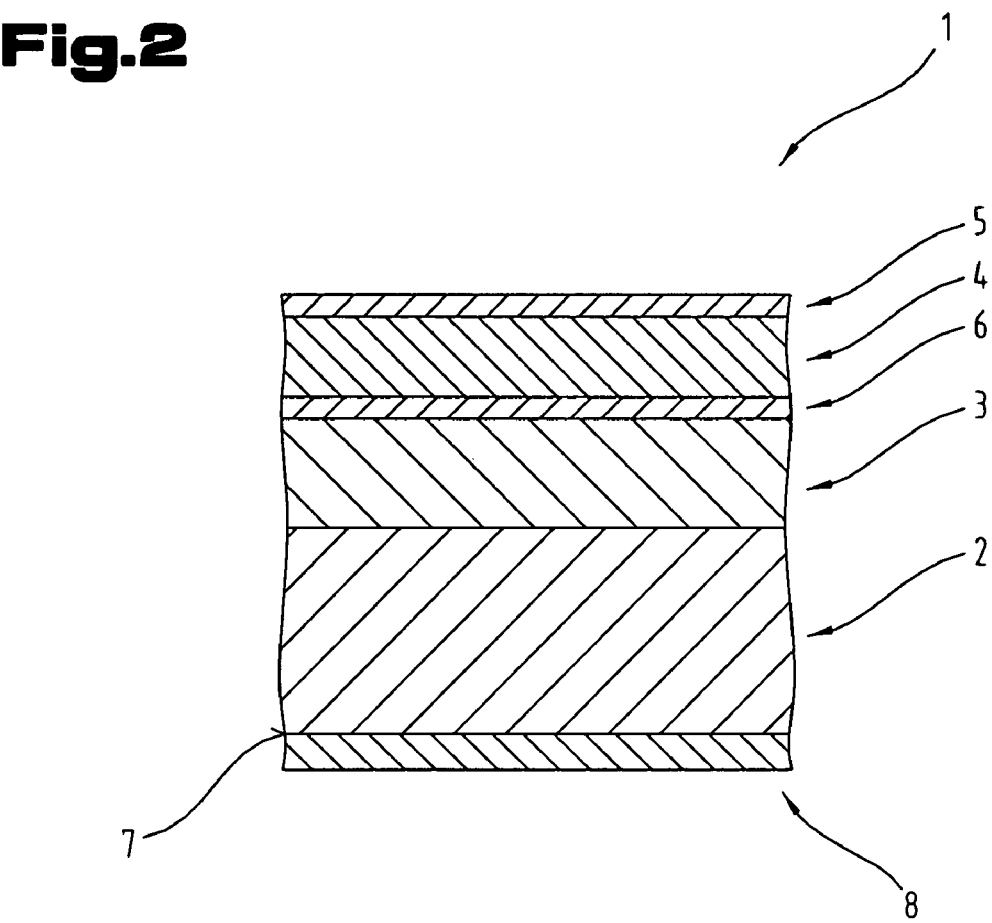
FIG. 2 shows a detail of an embodiment of a bearing with six layers, illustrated in cross-section.

FIG. 2 illustrates an embodiment of the multi-layered bearing 1, which in this instance comprises the supporting metal layer 2, the bearing metal layer 3 on top of it and the anti-friction layer 4 on top of the bearing metal layer 3 and then the wearing layer 5 on top of it.

The supporting metal layer 2 and the bearing metal layer 3 may be the same as those of the embodiment illustrated in FIG. 1.

The wearing layer 5 may be a so-called bismuth flash—as described above.

In this embodiment, the anti-friction layer 4 is a copper-bismuth alloy or a silver-bismuth alloy. The bismuth content may be selected from a range with a lower limit of 2% by weight in the case of a silver-bismuth alloy or 0.5% by weight in the case of a copper-bismuth alloy and an upper limit of 49% by weight in each case. These alloys may be of the compositions specified in Tables 1 and 2, for example.

TABLE 1

| Number | Ag [% by weight] | Bi [% by weight] |
|---|---|---|
| 1 | 99 | 1 |
| 2 | 95 | 5 |
| 3 | 90 | 10 |
| 4 | 88 | 12 |
| 5 | 82 | 18 |
| 6 | 75 | 25 |
| 7 | 70 | 30 |
| 8 | 65 | 35 |
| 9 | 60 | 40 |
| 10 | 52 | 48 |

TABLE 2

| Number | Cu [% by weight] | Bismuth [% by weight] |
|---|---|---|
| 11 | 98 | 2 |
| 12 | 97 | 7 |
| 13 | 90 | 10 |
| 14 | 85 | 15 |
| 15 | 78 | 22 |
| 16 | 70 | 30 |
| 17 | 65 | 35 |
| 18 | 60 | 40 |
| 19 | 56 | 54 |
| 20 | 51 | 49 |

FIG. 1

An intermediate layer 6 is provided between the bearing metal layer 3 and the anti-friction layer 4 in this embodiment. This intermediate layer 6 may be an anti-friction layer 4 of copper in the case of a copper-bismuth alloy and of copper or silver in the case of a silver-bismuth alloy.

The multi-layered bearing 1 illustrated in FIG. 2 may also have a flash coating 7 of silver or copper on a rear face 8 of the supporting metal layer 2. To simplify production, this flash coating may be of silver, even if silver is also used for the intermediate layer 6, or may be copper if copper is used for the intermediate layer 6. Mixtures are also possible, however.

In addition to the embodiment in which only the rear surface of the supporting metal layer 2 is coated with the flash coating 7, it is also possible to coat the side and end faces of the supporting metal layer 2 with silver or copper as well and generally speaking, the entire supporting metal layer 2 may be coated with silver or copper, so that, as an alternative to the described embodiment, such a coating of silver or copper is also applied between the supporting metal layer 2 and the bearing metal layer 3. If the flash coating 7 is not needed for these embodiments, it may be removed by mechanical processing, for example, such as polishing for example.

In this embodiment, the layer thickness of the wearing layer 5 is selected from a range with a lower limit of 1 μm and an upper limit of 10 μm, preferably a lower limit of 3 μm and an upper limit of 6 μm The layer thickness of the anti-friction layer 4 is preferably selected from a range with a lower limit of 5 μm and an upper limit of 30 μm, in particular a lower limit of 8 μm and an upper limit of 20 μm. The layer thickness for the intermediate layer 6 may be selected from a range with a lower limit of 0.5 μm and an upper limit of 5 μm, preferably a lower limit of 1 μm and an upper limit of 3 μm. The bearing metal layer 3 may have a layer thickness selected from a range with a lower limit of 0.1 mm and an upper limit of 1 mm. The supporting metal layer 2 may in turn have a layer thickness selected from a range with a lower limit of 1 mm and an upper limit of 10 mm. Finally, the flash coating 7 may have a layer thickness selected from a range with a lower limit of 0.1 μm and an upper limit of 5 μm, in particular a lower limit of 1 μm and an upper limit of 3 μm.

It goes without saying that in the embodiment of a connecting rod with a directly applied coating, the layer thickness of the supporting metal layer 2 differs significantly from the figures given above.

These values naturally also apply to the relevant layers applied to the embodiment illustrated as an example in FIG. 1.

Instead of using copper or silver for the intermediate layer 6, the latter may also be formed by aluminum or manganese or nickel or iron or chromium or cobalt or molybdenum or palladium or a nickel-tin-alloy, such as $Ni_2Sn_3$, $Ni_3Sn_4$, or a copper-tin-alloy, such as $Cu_6Sn_5$, for example.

As mentioned above, the wear resistance of the anti-friction layer 4 can be improved by incorporating nano-particles. These may have a grain size selected from a range with a lower limit of 10 nm and an upper limit of 1000 nm, for example with an upper limit of 100 nm. The anti-friction layer 4 is preferably produced in such a way that these hard particles are incorporated in the dispersed bismuth phase. The anti-friction layer 4 itself may be produced by a metal smelting process for this purpose and may be applied by roll plating onto the bearing metal layer 3 or a layer disposed in between. It has proved to be particularly expedient to use particles selected from a group comprising $TiO_2$, $ZrO_2$, $Al_2O_3$, diamond. The proportion of nano-particles to the respective binary alloy is between 0.05% by volume, preferably 0.5% by volume, and 5% by volume, preferably 3% by volume, relative to the respective silver-bismuth or copper-bismuth alloy comprising a total of 100% by weight silver or copper and bismuth.

In another embodiment, it is possible to provide a so-called concentration gradient within the anti-friction layer 4 with respect to the bismuth concentration. This being the case, the bismuth concentration varies starting from the surface lying closest to the bearing metal layer 3 or the intermediate layer 6 in the direction towards the wearing layer 5 or running surface, so that the bismuth concentration increases. As a result, this anti-friction layer 4 is softer in the region of the wearing layer 5, which means that its embedding capacity for foreign particles increases. As mentioned above, the concentration may be varied. The bismuth content within the layer may increase to the degree that the uppermost layer of the anti-friction layer 4 is formed by pure bismuth or a bismuth alloy with a very low copper or silver content, in other words the silver or copper-based alloy changes to a bismuth-based alloy.

The following changes in concentration are possible, for example:

TABLE 3

| Example | Initial concentration of Bi as a % by weight in the region of the bearing metal layer 3 | Final concentration of Bi as a % by weight in the region of the wearing layer 5 | Increase |
|---|---|---|---|
| 1 | 2 | 95 | by $x^2$ |
| 2 | 10 | 45 | linear |
| 3 | 4 | 100 | logarithmic |
| 4 | 10 | 74 | by $x^3$ |
| 5 | 7.5 | 50 | linear |
| 6 | 25 | 100 | in 5% steps |
| 7 | 25 | 98 | linear |
| 8 | 32 | 80 | in 10% steps |
| 9 | 6 | 45 | exponential |

The examples set out in Table 3 should not be construed as restrictive but merely as possible examples of the concentration gradients.

Providing concentration gradients within the anti-friction layer 4 enables the hardness as measured by Vickers to be increased from 15 HV (pure bismuth) to 250 HV (e.g. for a CuBi5 alloy for example).

In addition to producing the multi-layered bearing 1 by metal smelting, it is also possible to produce the wearing layer 5, copper-bismuth or silver-bismuth alloy for the anti-friction layer 4, the intermediate layer 6 and the flash coating 7 by means of a galvanic process or by means of a PVD process and combinations of these processes are also possible.

Processes of this type are known and the skilled person should refer to the relevant literature for more details.

In one particular embodiment, the anti-friction layer 4 is galvanically applied to a semi-finished product. The supporting metal layer 2 of the semi-finished product is plated with the bearing metal layer 3.

Since the electrochemical potential of the coating components, silver or copper and bismuth, are relatively close to one another when complexed in this manner, it is possible to formulate a stable electrolyte based on weak complexing. The following two electrolytes may be regarded as respective alternatives.

Electrolyte 1:

| | |
|---|---|
| silver in the form of $KAg(CN)_2$ | 22 g/l. |
| bismuth $BiO(NO_3) \cdot H_2O$ | 7 g/l. |
| KOH | 35 g/l. |
| $KNaC_4H_4O_6 \cdot 4H_2O$ | 60 g/l |
| surfactant | 0.1 g/l |

The coating was applied with a current density of 0.75 $A/dm^3$ with the bath at a temperature of 25° C.

Electrolyte 2:

| | |
|---|---|
| silver in the form of methane sulphonate (MSA) | 30 g/l |
| bismuth in the form of methane sulphonate (MSA) | 7 g/l |
| protein amino acid | 100 g/l |
| surfactant | 0.1 g/l |

The coating was applied with a current density of 1 $A/dm^3$ at a temperature of 25° C.

Instead of the silver salts in electrolytes 1 and 2 above, it is also possible to use copper salts, such as Cu-methane sulphonate, Cu-fluoroborate, Cu-sulphate, Cu-pyrophosphate, Cu-phosphonate, etc., for example.

At this stage, it should be pointed out that in addition to galvanic coating, it is also possible to apply a finished anti-friction layer 4 made from the above-mentioned alloys to the bearing metal layer 3 or a coating in between by means of roll plating. Roll plating is a method known from the prior art and the skilled person may refer to the relevant literature for more details.

The anti-friction layer 4 may also be produced by cathode sputtering. Two respective cathodes may be used for this purpose, one made from silver or copper and the other made from bismuth. In this respect, it is also possible to produce graded concentrations of bismuth within the layer by operating the cathodes at different power ratings during the course of the coating process, for example with the power of the bismuth cathode at the lowest at the start of the deposition process and slowly increasing it—either in steps or continuously—to its final value during the coating process.

Likewise, it would be possible to produce the alloy composition by varying the application conditions during a galvanic process, for example by varying the temperature or by varying the current density, in order to obtain a graded layer.

In one particular embodiment, the wearing layer 5 is produced galvanically and the bath is based on the following composition and the coating applied on the basis of the parameters set out below.

Example 1

Bath Composition for Galvanic Coating 50 g/l Bi in the form of methane sulphonate 80 g/l methane sulphonic acid to improve conductivity Addition of smoothing agent and at least one surfactant Operating Data:

Room temperature

Current density: 1.5 A/dm$^2$ or 3 A/dm$^2$ or 15 A/dm$^2$ (for a stronger flow)

Example 2

Bath Composition for Galvanic Coating 70 g/l Bi in the form of methane sulphonate 50 g/l methane sulphonic acid to improve conductivity 1 g/l standard surfactant to improve wettability 0.5 g/l coat smoothing additive ("leveler")

Operating Data:

Room temperature

Current density: 2 A/dm$^2$

X-ray diffraction images were taken of the resultant wearing layer 5. The corresponding intennsities are set out in Table 1.

| Level | Intensity |
|---|---|
| 012 | 4561 |
| 014 | 223 |
| 110 | 161 |
| 202 | 82 |

-continued

| Level | Intensity |
|---|---|
| 024 | 339 |
| 116 | 178 |
| 112 | 125 |

CuK$\alpha$ radiation was used for imaging purposes.

In the case of a bismuth coating, the hardness was found to be 17 UMHV 2p and in the case of a BiCu10 wearing layer 5 was found to be 30 UMHV 5p. UMHV stands for Ultra-micro hardness Vickers at 2 Pond or 5 Pond load.

The wearing layer 5 may also be made from a bismuth alloy containing 8% by weight of tin with a clear orientation of the crystal structure at the (012) or (012) plane.

In order to change the structure of the anti-friction layer 4 made from silver-bismuth or copper-bismuth alloy, it is also possible to add other additives known from the prior art to the bath.

If using pure silver—containing the impurities that occur during the production process—the advantage is that no cold welding occurs.

All the figures given for the ranges of values in the description should be construed as meaning that that these and all part-ranges are included, for example 1 to 10 should be construed as including all part-ranges, starting from the lower limit of 1 and up to the top limit of 10, i.e. all part ranges start with a lower limit of 1 or more and end with an upper limit of 10 or less, e.g. 1 to 1.7 or 3.2 to 8.1 or 5.5 to 10.

The embodiments illustrated as examples represent possible variants of the multi-layered bearing 1 and it should be pointed out at this stage that the invention is not specifically limited to the embodiments specifically illustrated, and instead the individual embodiments may be used in different combinations with one another and these possible variations lie within the reach of the person skilled in this technical field given the disclosed technical teaching. Accordingly, all conceivable variants which can be obtained by combining individual details of the embodiments described and illustrated are possible and fall within the scope of the invention. In particular, the invention is not restricted to the four-layered and six-layered bearings descnbed above, and at least one additional layer may be provided if necessary.

In particular, the invention is not limited to the preferred use of bismuth or bismuth alloy coatings with a preferred orientation in a specific lattice plane or group of lattice planes.

For the sake of good order, finally, it should be pointed out that in order to provide a clearer understanding of the structure of the multi-layered bearing 1, it and its constituent parts are illustrated to a certain extent out of scale and/or on an enlarged scale and/or on a reduced scale.

The independent solutions proposed by the invention and the underlying objectives may be found in the description.

Above all, the individual embodiments of the subject matter illustrated in FIGS. 1 and 2 constitute independent solutions proposed by the invention in their own right. The objectives and associated solutions proposed by the invention may be found in the detailed descriptions of these drawings.

LIST OF REFERENCE NUMBERS

1 Multi-layered bearing
2 Supporting metal layer
3 Bearing metal layer
4 Anti-friction layer 5 Wearing layer
6 Intermediate layer
7 Flash coating
8 Rear face

What is claimed is:

1. A multi-layered bearing comprising: a supporting metal layer, optionally a bearing metal layer disposed on top of it, an anti-friction layer on top of the supporting metal layer or the bearing metal layer, and a wearing layer disposed thereon; the anti-friction layer comprising a copper-bismuth or silver-bismuth alloy; and the wearing layer comprising bismuth or a bismuth alloy, wherein the copper-bismuth or silver-bismuth alloy of the anti-friction layer is formed with a matrix of copper or silver, each containing the unavoidable impurities which occur when producing these metals, and bismuth in a proportion selected from a range with a lower limit of 2% by weight in the case of silver or 0.5% by weight in the case of copper and in each case an upper limit of 49% by weight.

2. The multi-layered bearing as claimed in claim 1, wherein the crystallites of the bismuth or the bismuth alloy in the wearing layer assume a preferred direction in terms of their orientation, expressed by the Miller Index, of lattice plane (012) or {012}, and the X-ray diffraction intensity of the lattice plane (012) or {012} is highest compared with the X-ray diffraction intensities of the other lattice planes.

3. The multi-layered bearing as claimed in claim 2, wherein the X-ray diffraction intensity of the lattice plane with the second highest X-ray diffraction intensity assumes a maximal value of 10% of the X-ray diffraction intensity of the lattice plane (012) or {012}.

4. The multi-layered bearing as claimed in claim 2, wherein the lattice plane with the second highest X-ray diffraction intensity is that with the Miller-Index (024) or {024}.

5. The multi-layered bearing as claimed in claim 2, wherein the sum of the X-ray diffraction intensities of all the other lattice planes that are different from the lattice plane (012) or {012} assumes a maximal value of 25% of the X-ray diffraction intensity of the lattice plane (012) or {012}.

6. The multi-layered bearing as claimed in claim 1, wherein the wearing layer has a layer thickness selected from a range with a lower limit of 1 μm and an upper limit of 10 μm.

7. The multi-layered bearing as claimed in claim 1, wherein the anti-friction layer contains hard particles with a grain size, selected from a range with a lower limit of 10 nm and an upper limit of 100 nm.

8. The multi-layered bearing as claimed in claim 7, wherein the hard particles comprise oxides, carbides, nitrides, diamond, or a mixture of at least two different materials.

9. The multi-layered bearing as claimed in claim 7, wherein the proportion of hard particles by reference to the Ag/Bi or Cu/Bi alloy is selected from a range with a lower limit of 0.05% by volume and an upper limit of 5% by volume.

10. The multi-layered bearing as claimed in claim 7, wherein an intermediate layer is disposed between the anti-friction layer and the bearing metal layer, which is made from silver, copper, aluminum, manganese, nickel, iron, chromium, cobalt, molybdenum, palladium, a nickel-tin alloy or a copper-tin alloy.

11. The multi-layered bearing as claimed in claim 1, wherein a protective layer of silver or copper is provided between the supporting metal layer and the bearing metal layer.

12. The multi-layered bearing as claimed in claim 1, wherein the supporting metal layer has side faces, which are provided with a coating of silver or copper.

13. The multi-layered bearing as claimed in claim 1, wherein the supporting metal layer is completely coated with a silver or copper coating.

14. The multi-layered bearing as claimed in claim 1, wherein the anti-friction layer is a graded layer with an increasing concentration of bismuth in the direction towards the wearing layer.

15. The multi-layered bearing as claimed in claim 14, wherein within the anti-friction layer the copper-bismuth or silver-bismuth alloy in the region of the bearing metal layer or the intermediate layer or the supporting metal layer is replaced by bismuth or a bismuth alloy with a proportion of copper or silver in the region of the wearing layer.

16. The multi-layered bearing as claimed in claim 1, wherein the bearing metal layer is formed by a lead-free copper or aluminum based alloy.

17. The multi-layered bearing as claimed in claim 1, wherein the supporting metal layer is used for a connecting rod, a plain bearing half shell or a bearing bush.

18. Multi-layered bearing as claimed in claim 8, wherein the oxides include titanium dioxide, zirconium dioxide or aluminum oxide, the carbides include tungsten carbide and the nitrides include silicon nitride.

\* \* \* \* \*